United States Patent
Mitomo

(10) Patent No.: US 12,555,981 B2
(45) Date of Patent: Feb. 17, 2026

(54) LIGHT-EMITTING ELEMENT ARRAY AND METHOD OF PRODUCING LIGHT-EMITTING ELEMENT ARRAY

(71) Applicant: SONY SEMICONDUCTOR SOLUTIONS CORPORATION, Kanagawa (JP)

(72) Inventor: Jugo Mitomo, Kumamoto (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 592 days.

(21) Appl. No.: 17/920,234

(22) PCT Filed: Apr. 20, 2021

(86) PCT No.: PCT/JP2021/016009
§ 371 (c)(1),
(2) Date: Oct. 20, 2022

(87) PCT Pub. No.: WO2021/220879
PCT Pub. Date: Nov. 4, 2021

(65) Prior Publication Data
US 2023/0246424 A1    Aug. 3, 2023

(30) Foreign Application Priority Data
May 1, 2020   (JP) ................. 2020-081315

(51) Int. Cl.
*H01S 5/42* (2006.01)
*H01S 5/183* (2006.01)
(52) U.S. Cl.
CPC .......... *H01S 5/423* (2013.01); *H01S 5/18352* (2013.01)

(58) Field of Classification Search
CPC ............................. H01S 5/18352; H01S 5/423
See application file for complete search history.

(56) References Cited

U.S. PATENT DOCUMENTS

| 2017/0070027 A1* | 3/2017 | Kondo ............... H01S 5/423 |
| 2019/0006819 A1 | 1/2019 | Joseph |

(Continued)

FOREIGN PATENT DOCUMENTS

| JP | 2008-508730 A | 3/2008 |
| JP | 2009-246291 A | 10/2009 |

(Continued)

OTHER PUBLICATIONS

Khan, et al., "Fabrication of Integration-Capable Surface-Relief VCSEL Arrays for Miniaturized Optical Manipulation of Microparticles", Proceedings of 2013 2nd International Conference on Advances in Electrical Engineering (ICAEE), Dec. 19-21, 2013, pp. 395-400.

(Continued)

*Primary Examiner* — James A Menefee
(74) *Attorney, Agent, or Firm* — CHIP LAW GROUP

(57) ABSTRACT

A Provided is a light-emitting element array that includes a plurality of light-emitting elements two-dimensionally arranged on a light-emitting element surface of the light-emitting element array, each of the plurality of light-emitting elements being a vertical cavity surface emitting laser and being formed in a mesa shape surrounded by a recessed portion formed in the light-emitting element surface, an inclined surface being formed on an outer periphery of a light-emitting element group including the plurality of light-emitting elements, a depth of the recessed portion from the light-emitting element surface gradually increasing as away from the light-emitting element group.

6 Claims, 21 Drawing Sheets

(56) References Cited

U.S. PATENT DOCUMENTS

2020/0067263 A1* 2/2020 Hashimoto .......... H10H 20/013
2021/0296187 A1* 9/2021 Deng ................ H01L 21/30621

FOREIGN PATENT DOCUMENTS

| JP | 2014-507812 A | 3/2014 |
| JP | 2014-086562 A | 5/2014 |
| JP | 2017-147461 A | 8/2017 |
| WO | 2020/016578 A1 | 1/2020 |

OTHER PUBLICATIONS

International Search Report and Written Opinion of PCT Application No. PCT/JP2021/016009, issued on May 25, 2021, 11 pages of ISRWO.

* cited by examiner

LIGHT-EMITTING ELEMENT ARRAY AND METHOD OF PRODUCING LIGHT-EMITTING ELEMENT ARRAY

CROSS REFERENCE TO RELATED APPLICATIONS

This application is a U.S. National Phase of International Patent Application No. PCT/JP2021/016009 filed on Apr. 20, 2021, which claims priority benefit of Japanese Patent Application No. JP 2020-081315 filed in the Japan Patent Office on May 1, 2020. Each of the above-referenced applications is hereby incorporated herein by reference in its entirety.

TECHNICAL FIELD

The present technology relates to a light-emitting element array in which a plurality of light-emitting elements is arranged and a method of producing the light-emitting element array.

BACKGROUND ART

A light-emitting element such as a vertical cavity surface emitting laser (VCSEL) device is often used for a light-emitting element array in which a plurality of light-emitting elements is arranged. For example, Patent Literature 1 discloses a surface emitting semiconductor laser array in which a large number of VCSEL elements are two-dimensionally arranged. Each of the VCSEL elements has a mesa (plateau) shape and adjacent VCSEL elements are separated from each other by a recessed portion provided around the VCSEL element.

CITATION LIST

Patent Literature

Patent Literature 1: Japanese Patent Application Laid-open No. 2017-147461

DISCLOSURE OF INVENTION

Technical Problem

However, in the existing structure described in Patent Literature 1, there is a problem that the mechanical strength of the mesa is weakened when the pitch of the light-emitting element array is narrowed and the mesa is damaged when a liquid such as a cleaning liquid in a wafer cleaning process is sprayed into the light-emitting element array. This problem will be more serious as the density of the light-emitting element array increases in the future.

In view of the circumstances as described above, it is an object of the present technology to provide a light-emitting element array capable of preventing a light-emitting element from being damaged and a method of producing the light-emitting element array.

Solution to Problem

In order to achieve the above-mentioned object, a light-emitting element array according to an embodiment of the present technology includes: a plurality of light-emitting elements two-dimensionally arranged on a light-emitting element surface of the light-emitting element array, each of the plurality of light-emitting elements being a vertical cavity surface emitting laser and being formed in a mesa shape surrounded by a recessed portion formed in the light-emitting element surface, an inclined surface being formed on an outer periphery of a light-emitting element group including the plurality of light-emitting elements, a depth of the recessed portion from the light-emitting element surface gradually increasing as away from the light-emitting element group.

With this configuration, by providing the inclined surface on the outer periphery of the light-emitting element group, the water flow of a cleaning liquid or the like is dispersed by the inclined surface, and therefore, the mechanical strength of the mesa constituting the light-emitting element against the water flow increases, thereby making it possible to prevent the light-emitting element from being damaged.

The light-emitting element array may further include: a substrate; a first contact layer provided on the substrate; a first DBR (distributed Bragg reflector) layer provided on the first contact layer; an active layer; a second DBR layer that sandwiches the active layer with the first DBR layer; and a second contact layer provided on the second DBR layer, in which the active layer, the second DBR layer, and the second contact layer may each be separated by the recessed portion between the plurality of light-emitting elements, and the first contact layer and the substrate may each be continuous between the plurality of light-emitting elements.

The first DBR layer may be separated by the recessed portion between the plurality of light-emitting elements.

The inclined surface may be formed in one or both of the substrate and the first contact layer.

The inclined surface may have a shape whose depth from the light-emitting element surface changes by 1 µm or more.

In order to achieve the above-mentioned object, a method of producing a light-emitting element array according to an embodiment of the present technology includes: forming a recessed portion by reactive ion etching at 80° C. or less in a stacked body formed of a semiconductor material to form each a plurality of light-emitting elements in a mesa shape surrounded by the recessed portion formed in a light-emitting element surface, each of the plurality of light-emitting elements being a vertical cavity surface emitting laser, the plurality of light-emitting elements being two-dimensionally arranged on the light-emitting element surface and form an inclined surface on an outer periphery of a light-emitting element group including the plurality of light-emitting elements, a depth of the recessed portion from the light-emitting element surface gradually increasing as away from the light-emitting element group.

MODE(S) FOR CARRYING OUT THE INVENTION

A surface emitting laser device according to an embodiment of the present technology will be described.

[Configuration of Surface Emitting Laser Device]

Figure 1:
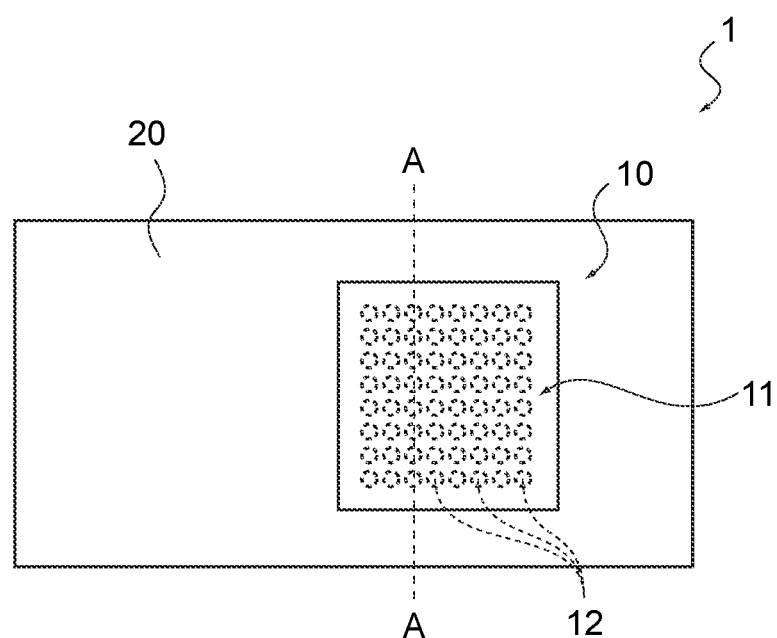
FIG. 1 is a plan view of a surface emitting laser device according to an embodiment of the present technology.
Figure 1:
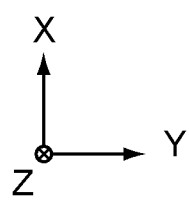
Figure 2:
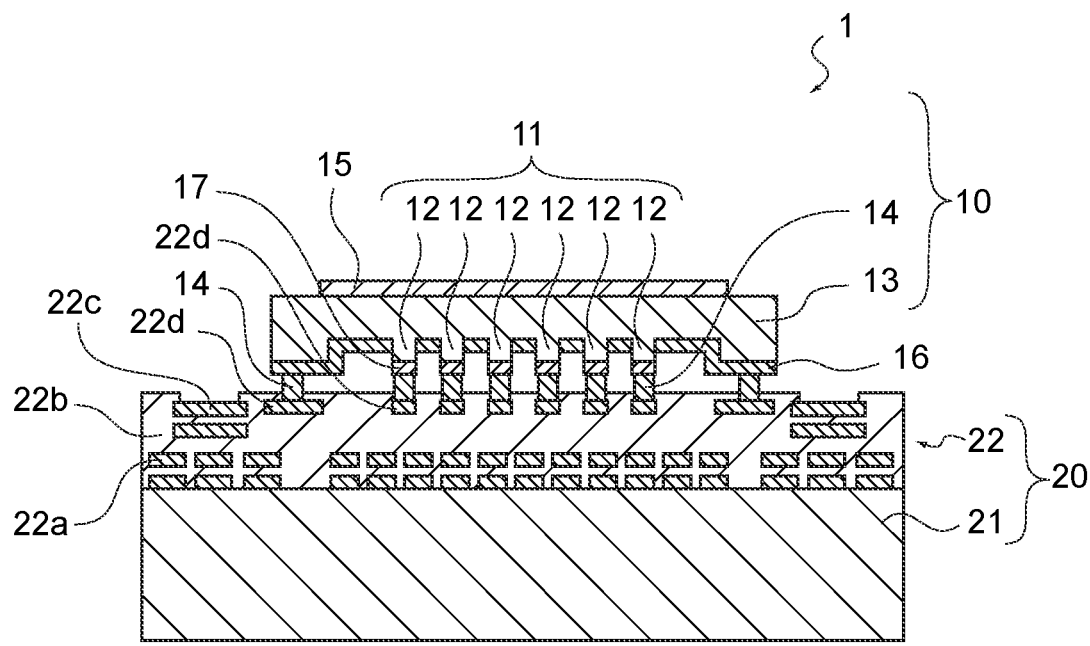
FIG. 2 is a cross-sectional view of the surface emitting laser device.

FIG. 1 is a plan view of a surface emitting laser device 1 according to this embodiment, and FIG. 2 is a cross-sectional view of the surface emitting laser device 1. FIG. 2 is a cross-sectional view taken along the line A-A in FIG. 1.

The surface emitting laser device 1 is a back surface emitting laser that can be suitably applied to applications that require thinness and low power consumption, applications that require thinness and a large area, and the like. As shown in FIG. 1 and FIG. 2, the surface emitting laser device 1 includes a laser chip 10 and a laser driver IC 20.

[Configuration of Laser Chip]

The laser chip 10 includes a substrate 13, a light-emitting element array 11 formed on a surface of the substrate 13 on the side of the laser driver IC 20, a plurality of bumps 14 formed between the substrate 13 and the laser driver IC 20, an AR (Anti-reflection) layer 15 formed on a surface (light-emitting surface) of the substrate 13 on the side opposite to the laser driver IC 20, and a first contact metal 16 and a second contact metal 17 formed on the surface of the substrate 13 on the side of the laser driver IC 20. The light-emitting element array 11 is disposed on the substrate 13 on the side opposite to the light-emitting surface. The AR layer 15 includes, for example, a stacked body obtained by stacking $SiO_2$ and SiN.

<Configuration of Light-Emitting Element Array>

As shown in FIG. 1 and FIG. 2, the light-emitting element array 11 includes a plurality of light-emitting elements 12 formed on the substrate 13. The plurality of light-emitting elements 12 is arranged on the substrate 13 at equal intervals in the row direction and at equal intervals also in the column direction. Further, the plurality of light-emitting elements 12 may be randomly arranged on the substrate 13.

Each of the light-emitting elements 12 is a vertical cavity surface emitting laser (VCSEL) device that emits a laser beam in a stacking direction. Each of the light-emitting elements 12 emits a laser beam to the side opposite to the laser driver IC 20 via the substrate 13 and the AR layer 15. The substrate 13 includes, for example, a semi-insulating semiconductor substrate (e.g., a Si—GaAs substrate) that causes light emitted from the light-emitting element 12 to be transmitted therethrough.

Figure 3:
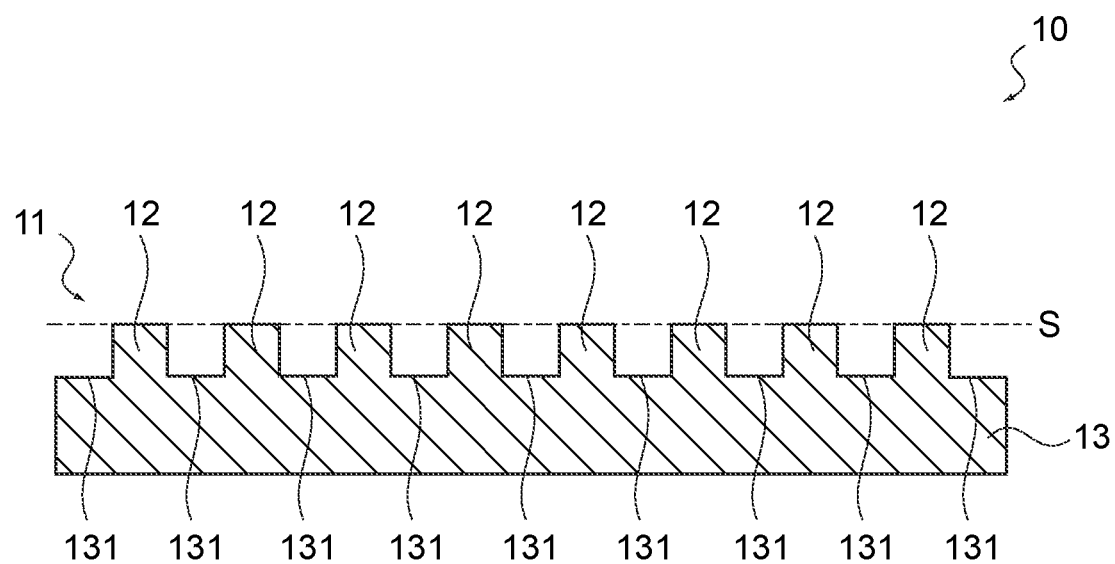
FIG. 3 is a cross-sectional view of a laser chip included in the emitting laser device.
Figure 3:
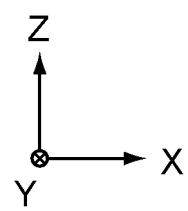
Figure 4:
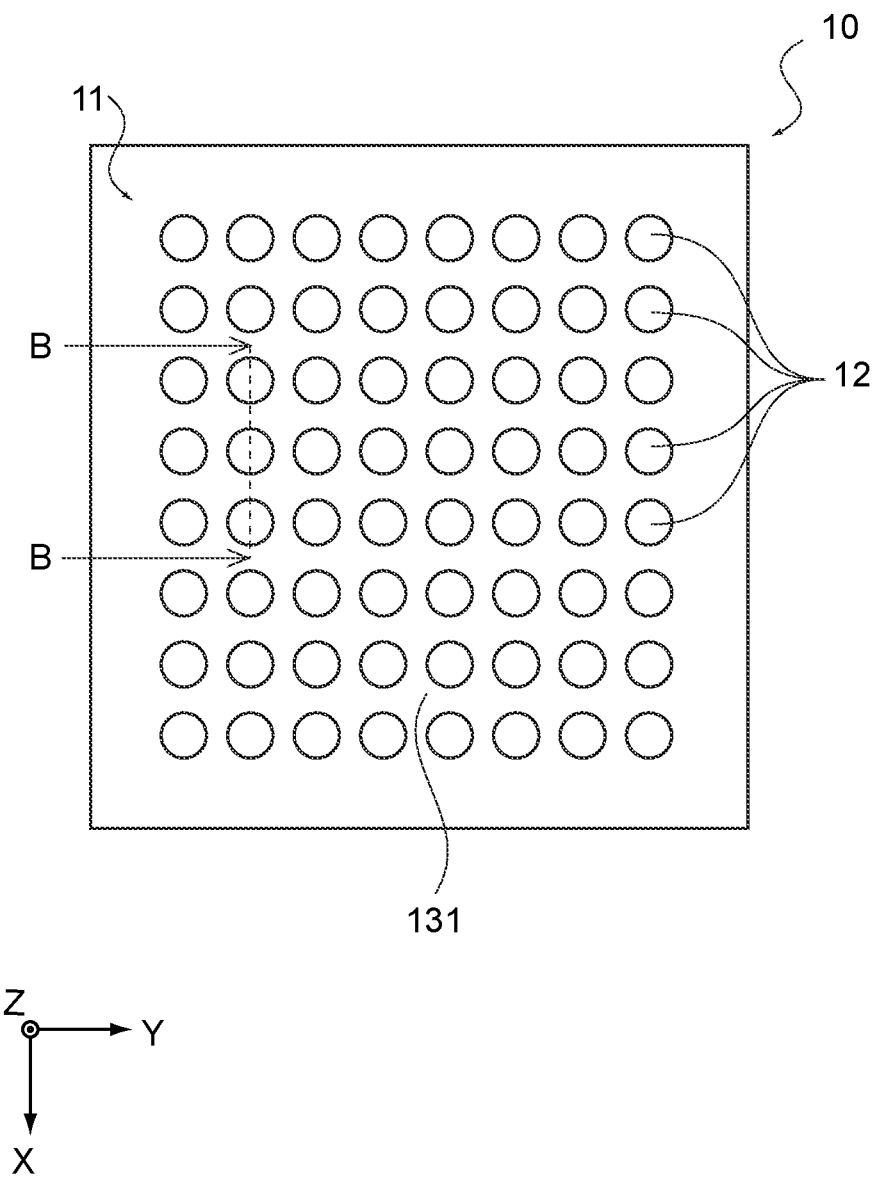
FIG. 4 is a plan view of the laser chip.
Figure 5:
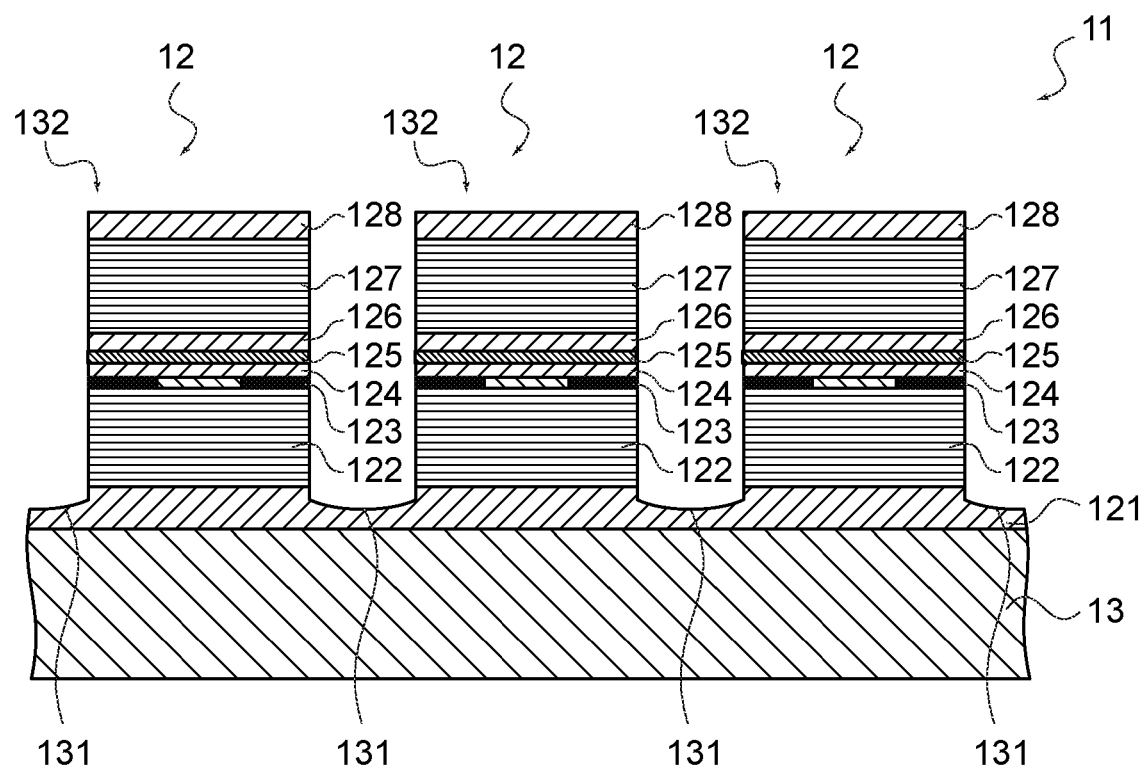
FIG. 5 is a cross-sectional view of a light-emitting element array included in the laser chip.

FIG. 3 is a cross-sectional view of the laser chip 10, and FIG. 4 is a plan view of the laser chip 10. FIG. 3 is a cross-sectional view taken along the line B-B in FIG. 4. FIG. 5 is an enlarged view of FIG. 3. As shown in FIG. 3 and FIG. 4, the plurality of light-emitting elements 12 is provided and two-dimensionally arranged on the substrate 13. As shown in FIG. 3, a plane on which the light-emitting element 12 is arranged will be referred to as a light-emitting element surface S. Recessed portions 131 dug down from the light-emitting element surface S are provided in the substrate 13. Each of the light-emitting elements 12 has a mesa (plateau) shape surrounded by the recessed portion 131. As shown in FIG. 5, the mesa forming the corresponding light-emitting element 12 will be referred to as a mesa 132.

Note that in the respective drawings of the present disclosure, the X direction is a direction parallel to the light-emitting element surface S, and the Y direction is a direction that is parallel to the light-emitting element surface S and orthogonal to the X direction. That is, the X-Y plane is a plane parallel to the light-emitting element surface S. Further, the Z direction is a direction that is orthogonal to the X direction and the Y direction and is a direction perpendicular to the light-emitting element surface S.

<Configuration of Light-Emitting Element>

Figure 6:
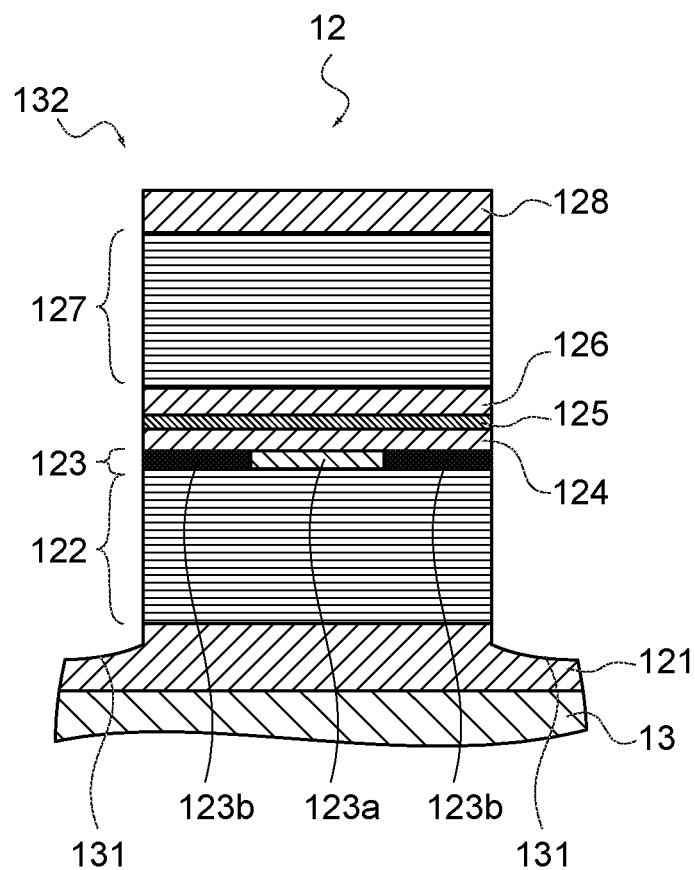
FIG. 6 is a cross-sectional view of a light-emitting element constituting the light-emitting element array.

FIG. 6 is a cross-sectional view showing one light-emitting element 12 and is an enlarged view of FIG. 5. As shown in the figure, the light-emitting element 12 includes a first contact layer 121, a first DBR layer 122, a current confinement layer 123, a first spacer layer 124, an active layer 125, a second spacer layer 126, a second DBR layer 127, and a second contact layer 128.

These layers are stacked on the substrate 13 in this order, an the substrate 13 can be formed as a crystal growth substrate. Here, layers other than the first contact layer 121, i.e., the first DBR layer 122, the current confinement layer 123, the first spacer layer 124, the active layer 125, the second spacer layer 126, the second DBR layer 127, and the second contact layer 128 are separated by the recessed portion 131 between the light-emitting elements 12, thereby forming the respective mesas 132. Note that the first DBR layer 122 does not necessarily need to be separated by the recessed portion 131 and may be continuous between the light-emitting elements 12.

The diameter of each mesa 132 (mesa diameter) is slightly smaller than the beam pitch of the laser beam emitted from the corresponding light-emitting element 12. For example, in the case where the beam pitch is set to approximately 18 μm, the diameter of each mesa 132 (mesa diameter) is set to approximately 14 μm.

The first contact layer 121 is a layer for bringing the first contact metal 16 (see FIG. 2) into ohmic contact with the first DBR layer 122 of each mesa 132. The first contact layer 121 is provided between each mesa 132 and the substrate 13 and is in contact with each mesa 132 and the substrate 13. In each light-emitting element 12, the first contact layer 121 is continuously formed. That is, the plurality of mesas 132 is arranged on the same first contact layer 121. The first contact layer 121 is formed of, for example, n-type $Al_{X1}Ga_{1-X1}As$ ($0 \le X1 < 1$).

The first DBR layer 122 is formed of an n-type semiconductor material, functions as a distributed Bragg reflector (DBR), and reflects light having a specific wavelength (hereinafter, the wavelength λ). The first DBR layer 122 constitutes an optical resonator for laser oscillation together with the second DBR layer 127. The first DBR layer 122 can be formed by alternately stacking a low-refractive index layer and a high-refractive index layer. The low-refractive index layer is formed of, for example, n-type $Al_{X2}Ga_{1-X2}As$ ($0 < X2 < 1$) having an optical thickness of ¼ λ, and the high-refractive index layer is formed of, for example, n-type $Al_{X3}Ga_{1-X3}As$ ($0 \le X3 < X2$) having an optical thickness of ¼ λ.

The current confinement layer 123 imparts a confinement action to a current. The current confinement layer 123 has a current injection region 123a and a current confinement region 123b. The current injection region 123a is provided in the center of the current confinement layer 123 and the current confinement region 123b is provided around the current injection region 123a. The current injection region 123a is formed of a conductive material and the current confinement region 123b is formed of an insulating material. The current confinement region 123b can be formed by oxidizing the constituent material of the current confinement layer 123 from the side surface of the mesa 132. For example, the current injection region 123a can be formed of n-type $Al_{X4}Ga_{1-X4}As$ ($0 < X4 \le 1$) and the current confinement region 123b can be formed of an oxide thereof.

The first spacer layer 124 is adjusted such that the interval between the first DBR layer 122 and the second DBR layer 127 is λ. The first spacer layer 124 is formed of, for example, n-type $Al_{X5}Ga_{1-X5}As$ ($0 \le X5 < 1$).

The active layer 125 emits and amplifies spontaneous emission light. The active layer 125 can include a plurality of layers obtained by alternately stacking a quantum well layer and a barrier layer. The quantum well layer is formed of, for example, $In_{X6}Ga_{1-X6}As$ ($0 < X6 < 1$) and the barrier layer is formed of, for example, $In_{X7}Ga_{1-X7}As$ ($0 < X7 < X6$).

The second spacer layer 126 is adjusted together with the first spacer layer 124 such that the interval between the first DBR layer 122 and the second DBR layer 127 is λ. The second spacer layer 126 is formed of, for example, p-type $Al_{X8}Ga_{1-X8}As$ ($0 \le X8 < 1$).

The second DBR layer 127 is formed of a p-type semiconductor material, functions as a DBR, and reflects light having the wavelength λ. The second DBR layer 127 constitutes an optical resonator for laser oscillation together with the first DBR layer 122. The second DBR layer 127 can be formed by alternately stacking a low-refractive index layer and a high-refractive index layer. The low-refractive index layer is formed of, for example, p-type $Al_{X9}Ga_{1-X9}As$ ($0 < X9 < 1$) having an optical thickness of ¼ λ and the high-refractive index layer is formed of, for example, p-type $Al_{X10}Ga_{1-X10}As$ ($0 \le X10 < X9$) having an optical thickness of ¼ λ.

The second contact layer 128 is a layer for bringing the second contact metal 17 (see FIG. 2) into ohmic contact with the second DBR layer 127 of each mesa 132. The second contact layer 128 is formed of, for example, p-type $Al_{X11}Ga_{1-X11}As$ ($0 \le X11 < 1$).

The light-emitting element 12 has the configuration as described above. As described above, the substrate 1 and the first contact layer 121 are each continuously formed between the plurality of light-emitting elements 12. Meanwhile, the layers from the first DBR layer 122 to the second contact layer 128 are each separated by the recessed portion 131 between the light-emitting elements 12, thereby forming the respective mesas 132. Note that in the structure of the light-emitting element 12 described above, the p-type and the n-type may be reversed.

<Regarding Inclined Surface in Light-Emitting Element Array>

Figure 7:
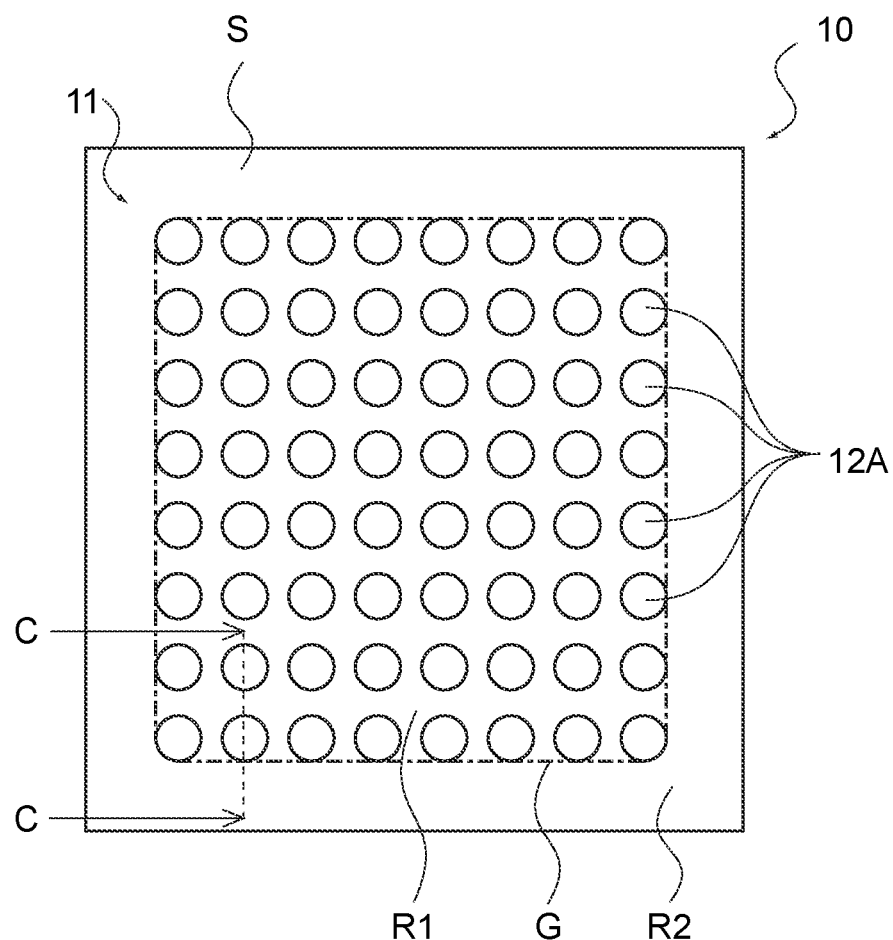
FIG. 7 is a schematic diagram showing a light-emitting element region and an outer peripheral region in the light-emitting element array.
Figure 7:
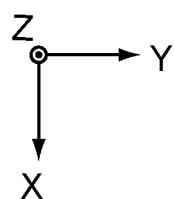

In the light-emitting element array 11, an inclined surface is provided around the light-emitting element 12. FIG. 7 is a plan view of the light-emitting element array 11. In the figure, a region where the plurality of light-emitting elements 12 is provided as viewed from a direction (Z direction) perpendicular to the light-emitting element surface S is defined as a light-emitting element region R1, and a region on the outer periphery side of the light-emitting element region R1 is defined as an outer peripheral region R2. Further, the boundary between the light-emitting element region R1 and the outer peripheral region R2, which is the outer periphery of a light-emitting element group including the plurality of light-emitting elements 12, is defined as an outer periphery G, and the light-emitting elements 12 positioned at the outermost periphery in the light-emitting element group are defined as light-emitting elements 12A.

Figure 8:
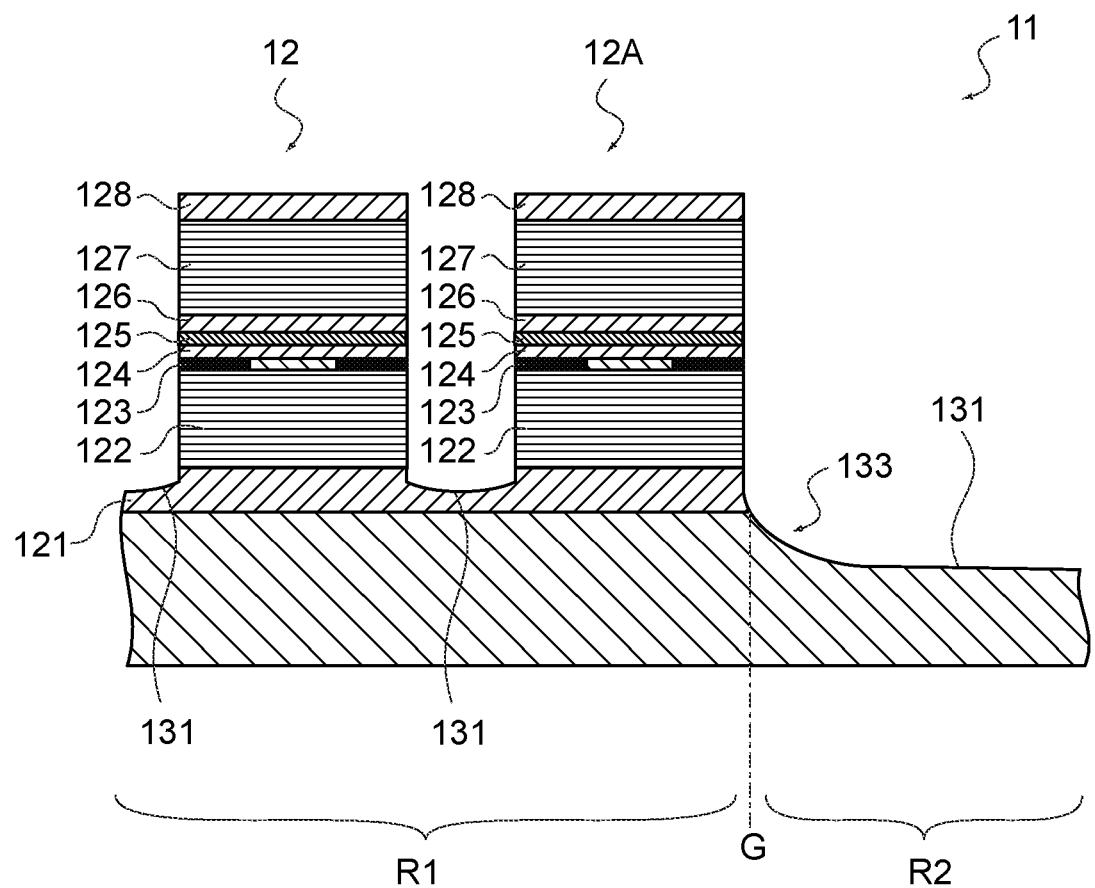
FIG. 8 is a cross-sectional view of the outer periphery of a light-emitting element group of the light-emitting element array.
Figure 9:
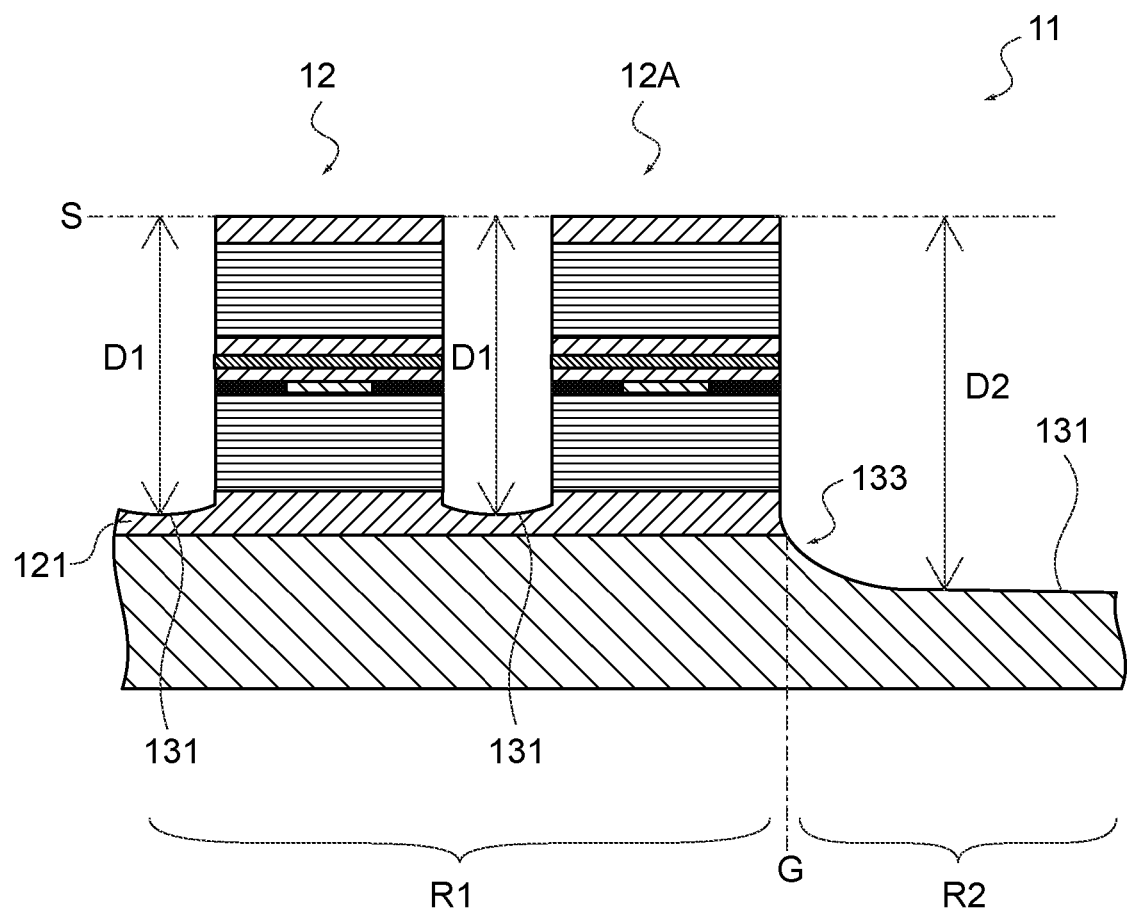
FIG. 9 is a schematic diagram showing a depth of recessed portion in the light-emitting element array.
Figure 9:
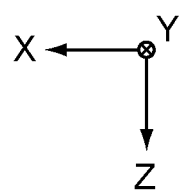

FIG. 8 is a cross-sectional view of the vicinity of the outer periphery G of the light-emitting element array 11 and is a cross-sectional view taken along the line C-C in FIG. 7. As shown in the figure, an inclined surface 133 is provided on the substrate 13 from the outer periphery G to the outer peripheral region R2. FIG. 9 is a schematic diagram showing a depth of the recessed portion 131. As shown in the figure, the depth of the recessed portion 131 from the light-emitting element surface S in the light-emitting element region R1 is defined as a depth D1, and the depth of the recessed portion 131 from the light-emitting element surface S at a position away from the outer periphery G in the outer peripheral region R2 is defined as a depth D2. As shown in FIG. 9, the inclined surface 133 is formed such that the depth of the recessed portion 131 from the light-emitting element surface S gradually increases from the depth D1 to the depth D2. Although the depth D1 and the depth D2 are not particularly limited, the depth D2 is suitably 1 μm or more larger than the depth D1.

Figure 10:
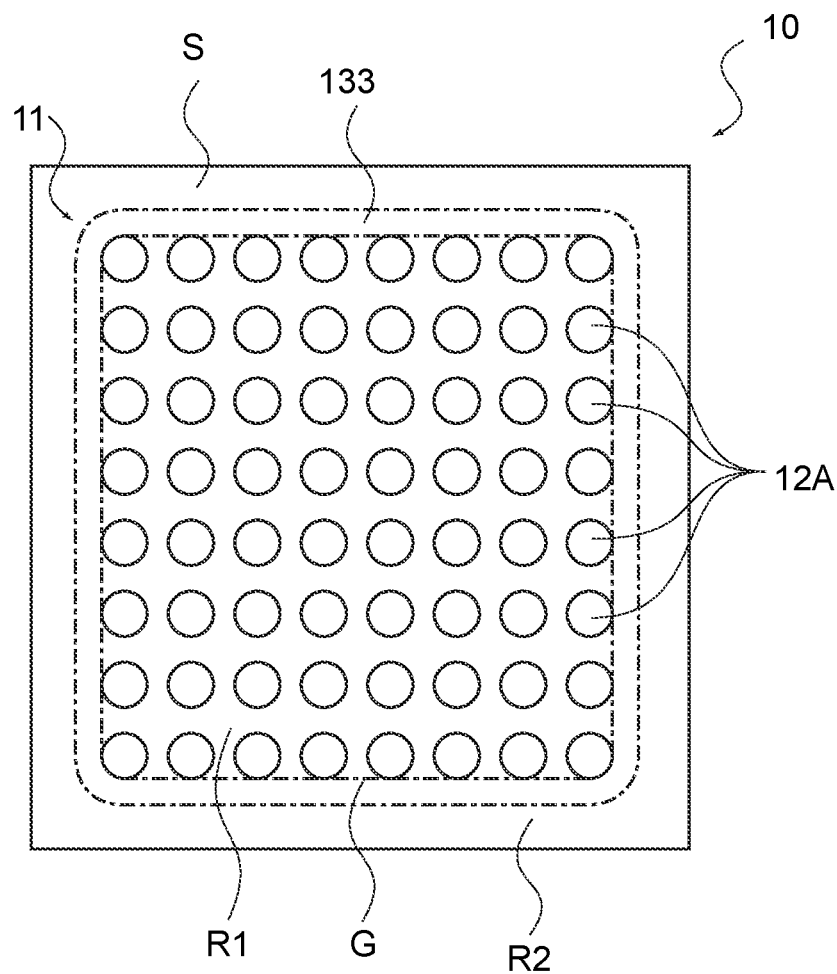
FIG. 10 is a schematic diagram showing disposition of an inclined surface in the light-emitting element array.
Figure 10:
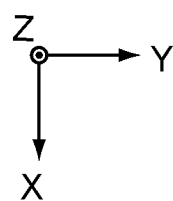

FIG. 10 is a schematic diagram showing the disposition of the inclined surface 133. As shown in the figure, the inclined surface 133 can be provided so as to surround the outer periphery G of the light-emitting element group. The width of the inclined surface 133 is not particularly limited but can be approximately the same as the width of the recessed portion 131 between the light-emitting elements 12. Further, the inclined surface 133 may be provided over the entire outer peripheral region R2.

Figure 11:
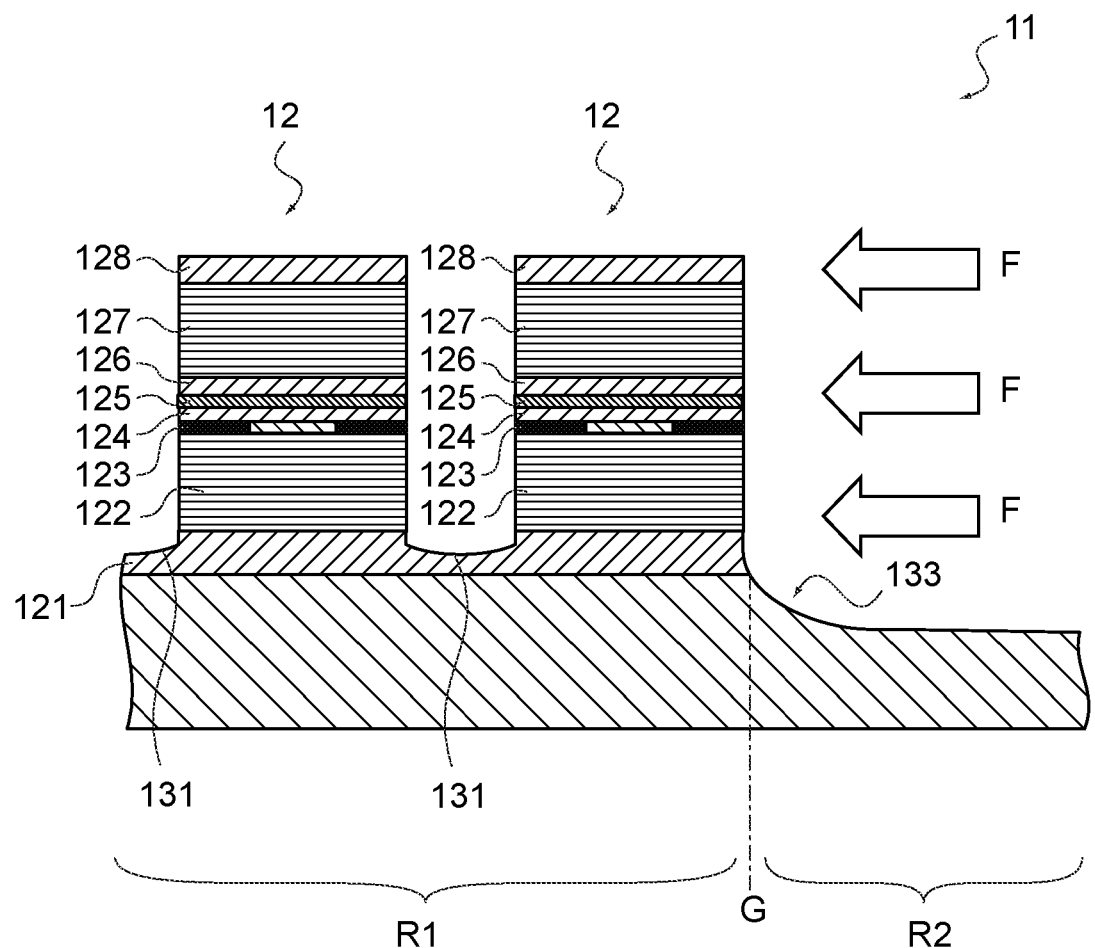
FIG. 11 is a schematic diagram showing an effect of the inclined surface in the light-emitting element array.

FIG. 11 is a schematic diagram showing an effect of the inclined surface 133. In a process such as wafer cleaning in a process of producing the light-emitting element array 11, a fluid such as a cleaning liquid is sprayed from the outer periphery side of the light-emitting element array 11 to the light-emitting element array 11. In FIG. 11, the water flow of the fluid sprayed into the light-emitting element array 11 is shown as a water flow F.

The water flow F tends to spread in a direction parallel to the substrate 13 on the wide surface of the outer peripheral region R2 in which the light-emitting element 12 is not provided, and the strongest water flow F hits the light-emitting elements 12A positioned at the outermost periphery of the light-emitting element group. Here, by providing the inclined surface 133 around the outer periphery G, the water flow F is dispersed by the inclined surface 133, and therefore, the mechanical strength of the mesa 132 constituting the light-emitting element 12A against the water flow F increases, thereby making it possible to prevent the mesa 132 from being damaged.

Figure 12:
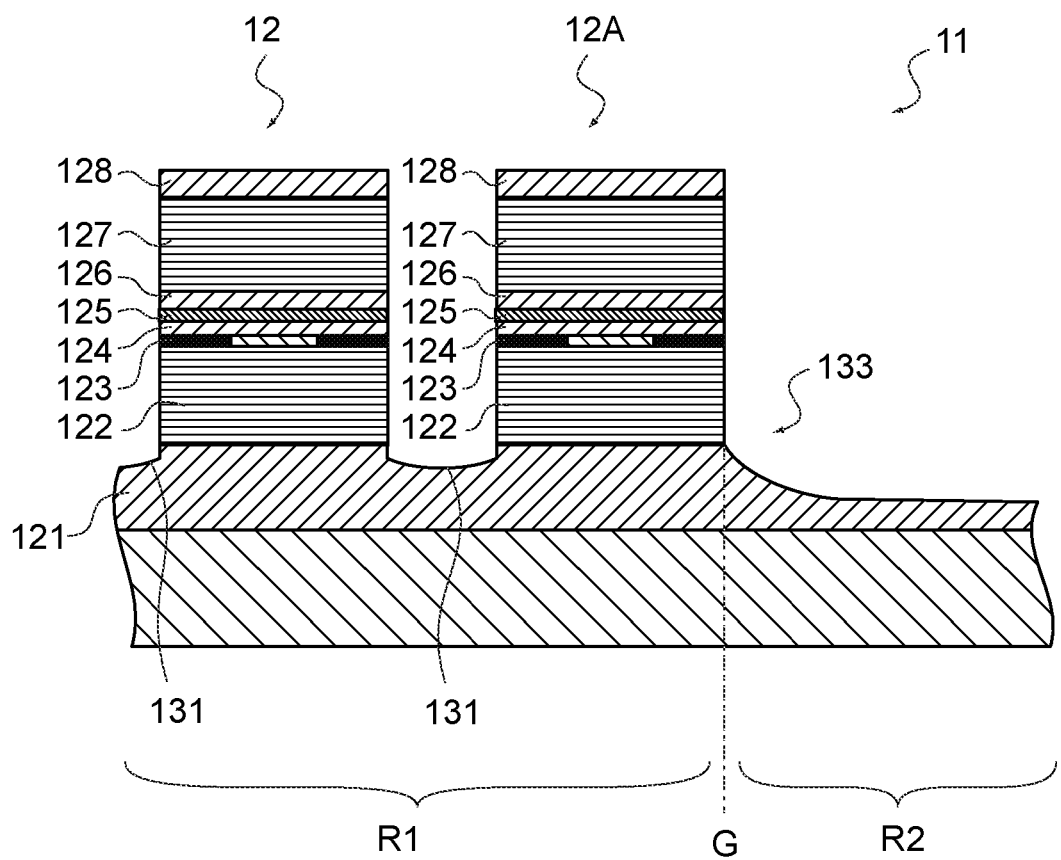
FIG. 12 is a cross-sectional view of the outer periphery of the light-emitting element group of the light-emitting element array.
Figure 13:
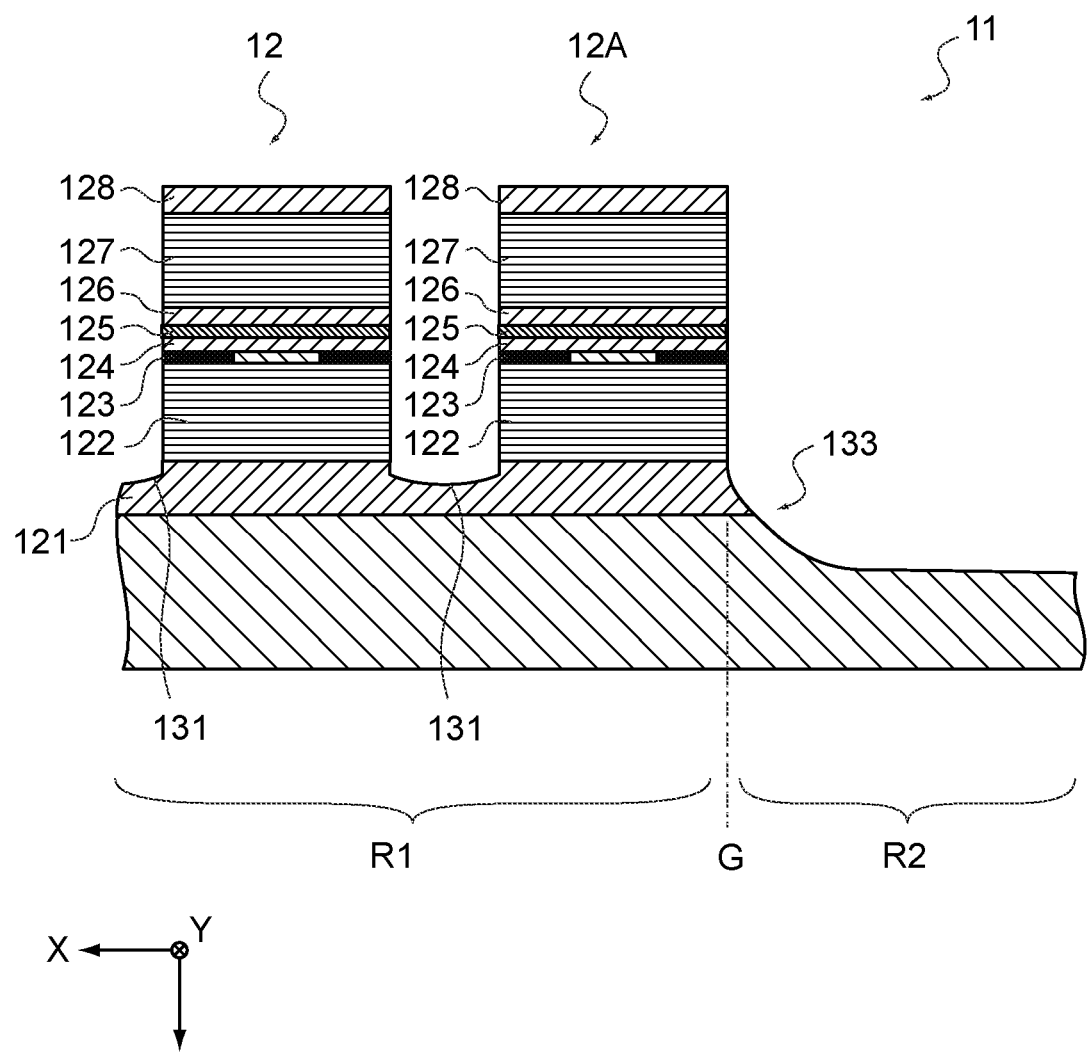
FIG. 13 is a cross-sectional view of the outer periphery of the light-emitting element group of the light-emitting element array.

Note that the configuration of the inclined surface 133 is not limited to the one shown here. FIG. 12 and FIG. 13 are each a schematic diagram showing another configuration of the inclined surface 133. Although the inclined surface 133 is formed on the substrate 13 in FIG. 8 and FIG. 9, the inclined surface 133 may be formed in the first contact layer 121 as shown in FIG. 12. Further, as shown in FIG. 13, the inclined surface 133 may be formed on both the first contact layer 121 and the substrate 13. Further, the inclined surface 133 is not limited to an inclined surface having a curved shape and may be an inclined surface having a flat shape.

Figure 14:
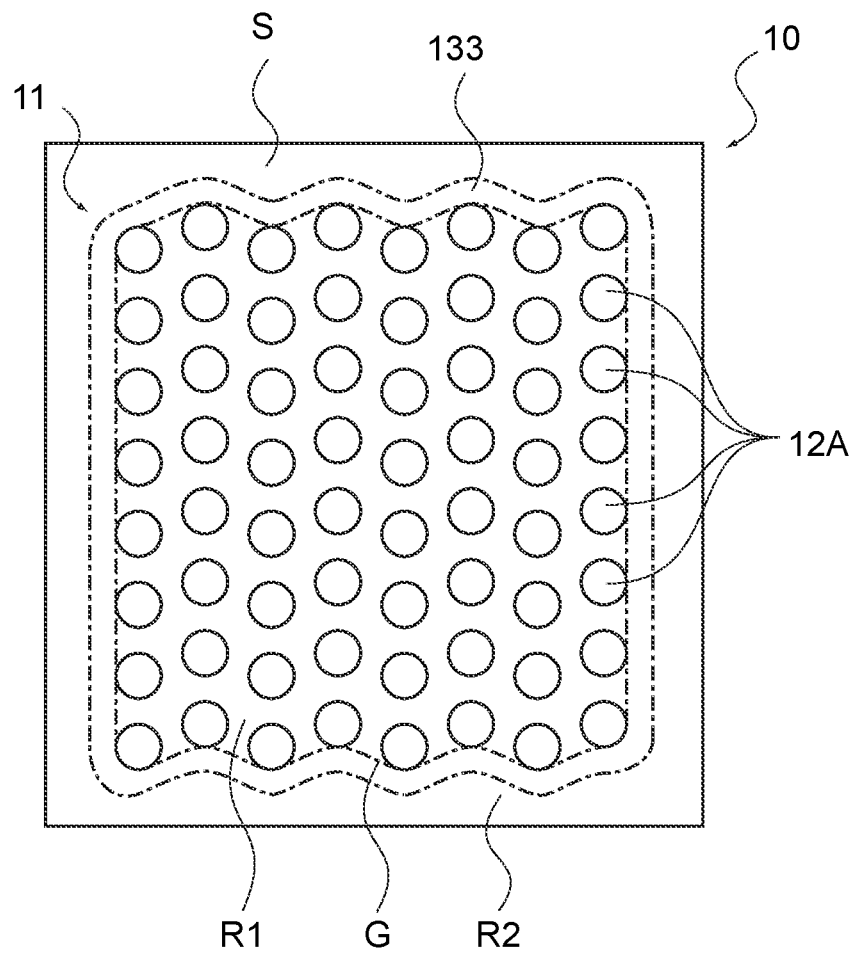
FIG. 14 is a schematic diagram showing disposition of the inclined surface in the light-emitting element array.
Figure 14:
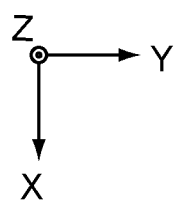

Further, also the disposition of the inclined surface 133 is not limited to the rectangular shape as shown in FIG. 10, and can be disposition corresponding to the arrangement of the light-emitting elements 12. FIG. 14 is a schematic diagram showing other disposition of the inclined surface 133. As shown in the figure, the inclined surface 133 can be disposed so as to surround the light-emitting elements 12A positioned at the outermost periphery.

[Configuration of Laser Driver IC]

As shown in FIG. 2, the laser driver IC 20 is provided so as to face the surface of the laser chip 10 on the side of the light-emitting element 12. The laser driver IC 20 is electrically connected to the first contact layer 121 that is continuous between the light-emitting elements 12 via the plurality of bumps 14 and the first contact metal 16 and is electrically connected to the second contact layer 128 of each light-emitting element 12 via the plurality of bumps 14 and the second contact metal 17. As a result, the laser driver IC 20 is capable of causing the individual light-emitting element 12 to independently emit light.

The laser driver IC 20 includes, in a substrate 21, a driver for controlling the voltage to be applied to the laser chip 10. This driver generates a drive pulse for causing the plurality of light-emitting elements 12 provided in the laser chip 10 to emit light and quenching. This driver is electrically connected to the laser chip 10 via a wiring layer 22.

The wiring layer 22 includes, in an insulation layer 22b, a plurality of metal layers 22a, a plurality of connection pads 22c, and a plurality of connection pads 22d. The plurality of metal layers 22a electrically connects the driver in the substrate 21 and the plurality of connection pads 22d to each other. The plurality of connection pads 22d is disposed in the wiring layer 22 at positions facing the laser chip 10 and is electrically connected to the plurality of bumps 14 provided in the laser chip 10. The plurality of connection pads 22c is disposed in the wiring layer 22 at positions not facing the laser chip 10 and is electrically connected to bonding wires 44 described below. Note that the electrical connection form between the laser chip 10 and the laser driver IC 20 is not limited to that described in FIG. 2.

Figure 15:
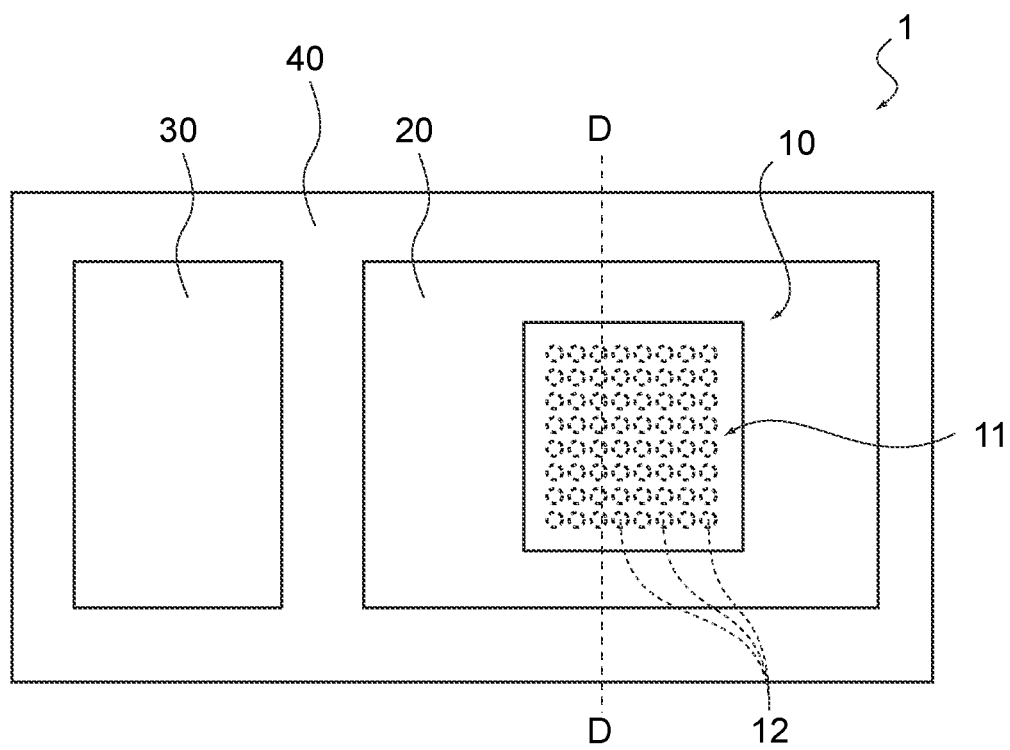
FIG. 15 is a plan view of the surface emitting laser device mounted on a printed wiring board.
Figure 15:
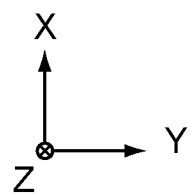
Figure 16:
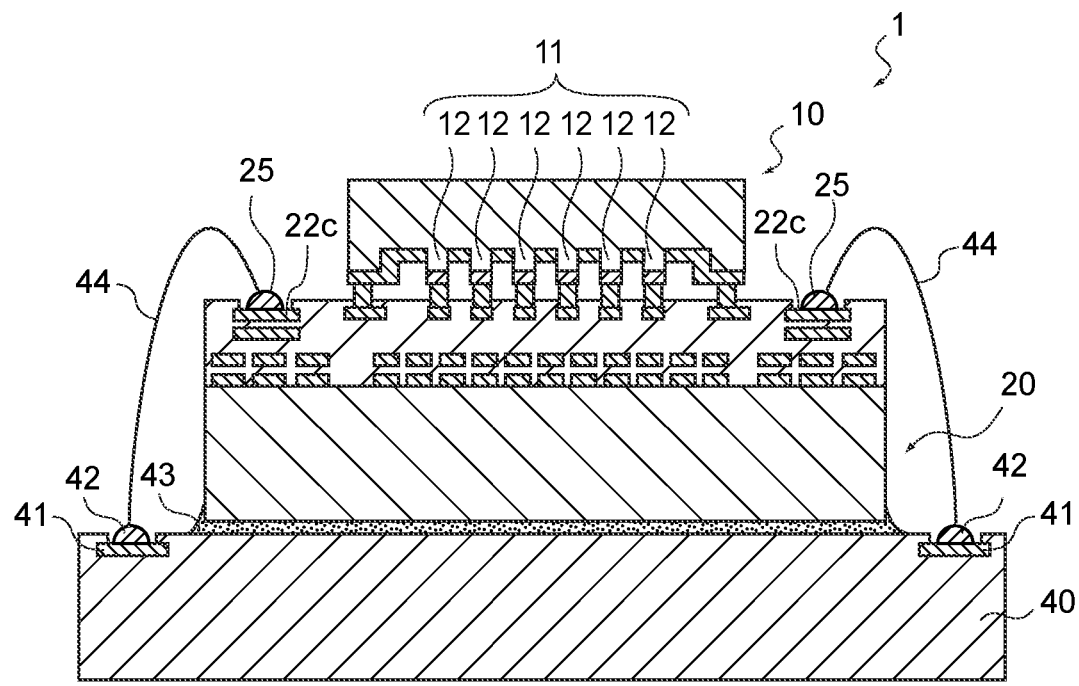
FIG. 16 is a cross-sectional view of the surface emitting laser device mounted on the printed wiring board.
Figure 16:
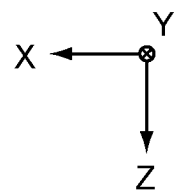

FIG. 15 shows a planar configuration example when the laser driver IC 20 is mounted on a printed wiring board 40. In the surface emitting laser device 1, for example, a system controller 30 is provided on the printed wiring board 40 in addition to the laser driver IC 20. FIG. 16 shows a cross-sectional configuration example taken along the line D-D in FIG. 15. A bonding layer 43 is provided between the laser driver IC 20 and the printed wiring board 40. The bonding layer 43 fixes the laser driver IC 20 and the printed wiring board 40 to each other. The bonding layer 43 is formed of, for example, an insulating resin material.

The laser driver IC 20 and the printed wiring board 40 are electrically connected to each other by the bonding wires 44. One end of the bonding wire 44 is fixed to the connection pad 22c of the laser driver IC 20 by solder 25, and the other end of the bonding wire 44 is fixed to a connection pad 41 of the printed wiring board 40 by solder 42.

[Method of Producing Light-Emitting Element Array]

Figure 17:
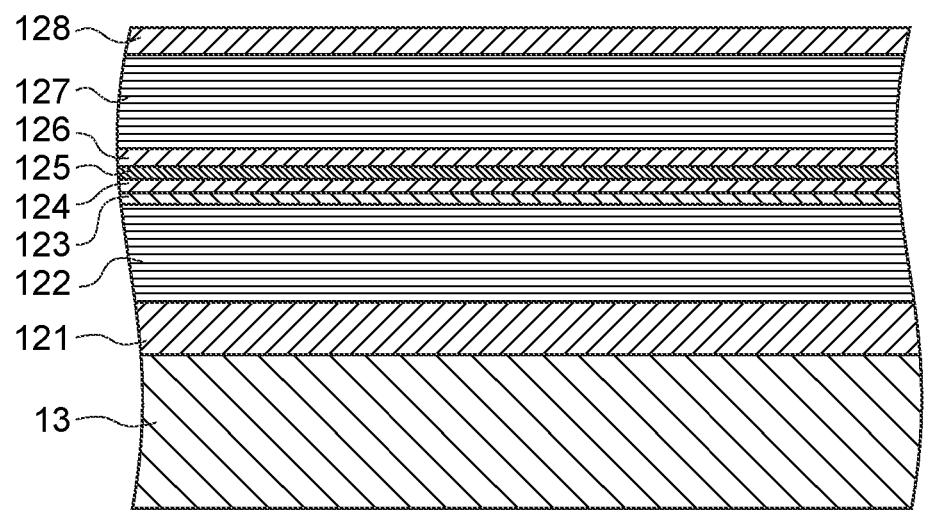
FIG. 17 is a schematic diagram showing a method of producing the light-emitting element array.
Figure 17:
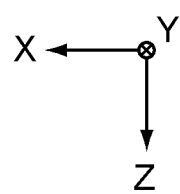
Figure 18:
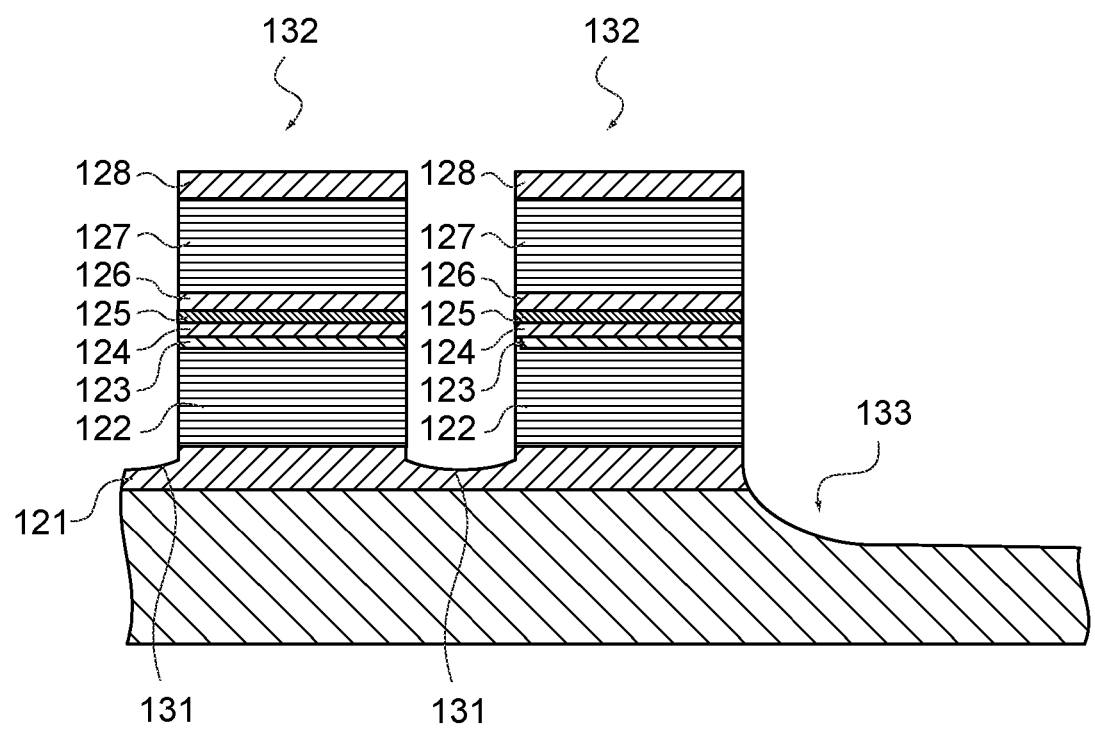
FIG. 18 is a schematic diagram showing the method of producing the light-emitting element array.

A method of producing the light-emitting element array 11 having the configuration described above will be described. FIG. 17 and FIG. 18 are each a schematic diagram showing a method of producing the light-emitting element array 11.

In order to produce the light-emitting element array 11, for example, a compound semiconductor is collectively formed on the substrate 13 formed of GaAs by an epitaxial crystal growth method such as a MOCVD (Metal Organic Chemical Vapor Deposition) method. At this time, for example, a methyl-based organometallic gas such as trimethylaluminum (TMAl), trimethylgallium (TMGa), and trimethylindium (TMIn) and an arsine ($AsH_3$) gas are used as a raw material of the compound semiconductor, disilane ($Si_2H_6$) is used as a raw material of doner impurity, and carbon tetrabromide ($CBr_4$) is used as a raw material of acceptor impurity.

First, as shown in FIG. 17, the first contact layer 121, the first DBR layer 122, the current confinement layer 123, the first spacer layer 124, the active layer 125, the second spacer layer 126, the second DBR layer 127, and the second contact layer 128 are formed on the substrate 13 in this order.

Next, for example, a resist layer (not shown) of a predetermined pattern is formed, and then, the second contact layer 128, the second DBR layer 127, the second spacer layer 126, the active layer 125, the first spacer layer 124, the current confinement layer 123, and the first DBR layer 122 are selectively etched using this resist layer as a mask.

At this time, it is favorable to use RIE (Reactive Ion Etching) with a Cl-based gas under conditions that the microloading effect is enhanced. The microloading effect is a phenomenon in which ions are prevented by the mask from entering a portion where the mask pattern is dense and the etching rate is reduced as compared with a portion where the mask pattern is coarse.

By performing RIE under the conditions in which the microloading effect is enhanced, a difference in etching rate occurs between the light-emitting element region R1 in which the mesas 132 are densely arranged and the outer peripheral region R2 in which the mesa 132 is not present, and the inclined surface 133 is naturally formed. Note that in order to enhance the microloading effect, it only needs to reduce the temperature at the time of RIE and the temperature is suitably 80° C. or less and more suitably room temperature (e.g., 25° C.)

As a result, as shown in FIG. 18, the recessed portion 131 reaching the first contact layer 121 and the mesa 132 are formed as well as the inclined surface 133 is formed. After that, the resist is removed. Note that although an example of using RIE for etching has been described here, the inclined surface 133 can be formed similarly by wet etching.

Next, oxidation treatment is performed at a high temperature in a steam atmosphere to oxidize the current confinement layer 123 from the side surface of the mesa 132. Further, this oxidation may be performed by a wet oxidation method. As a result, the outer peripheral region of the current confinement layer 123 is oxidized to form the current confinement region 123b (see FIG. 6), and the light-emitting element 12 is formed in the mesa 132. Further, the current injection region 123a that is an unoxidized region is formed in the inner periphery of the current confinement region 123b. The light-emitting element array 11 can be produced as described above. Note that the method of producing the light-emitting element array 11 is not limited to the one shown here, and the light-emitting element array 11 may be produced by another method.

Application Example

An application example of the surface emitting laser device 1 according to each embodiment will be described.

Figure 19:
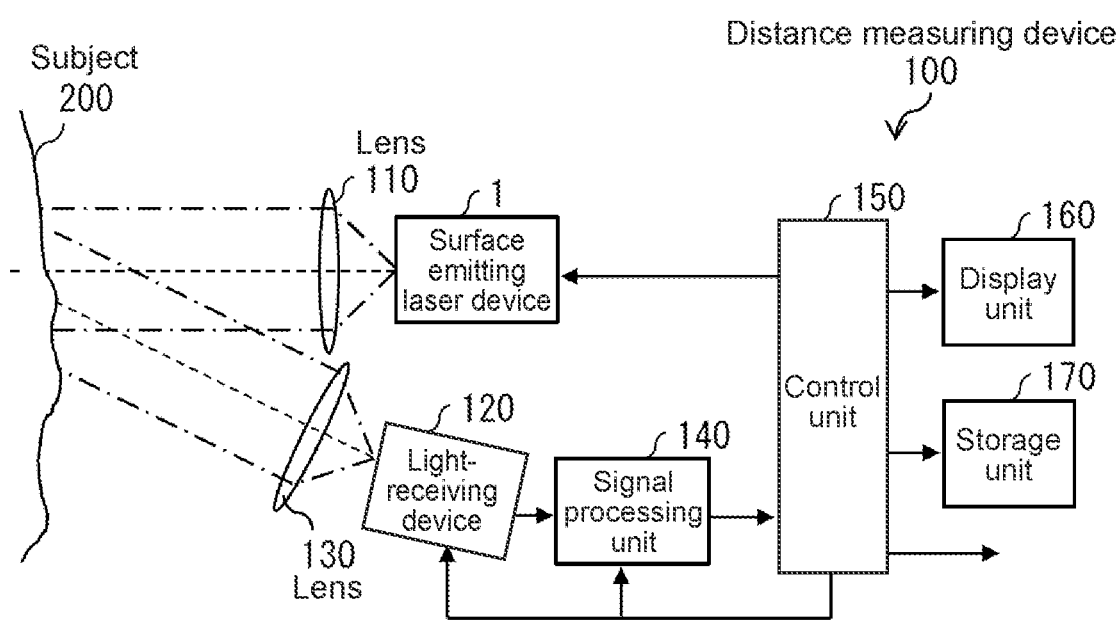
FIG. 19 is a block diagram of a distance measuring device according to an application example of the present technology.

FIG. 19 shows an example of a schematic configuration of a distance measuring device 100 including the surface emitting laser device 1. The distance measuring device 100 measures the distance to a subject 200 by a TOF (Time Of Flight) method. The distance measuring device 100 includes the surface emitting laser device 1 as a light source. The distance measuring device 100 includes, for example, the surface emitting laser device 1, a light-receiving device 120, lenses 110 and 130, a signal processing unit 140, a control unit 150, a display unit 160, and a storage unit 170.

The light-receiving device 120 detects light reflected by the subject 200. The lens 110 is a lens for collimating the light emitted from the surface emitting laser device 1 and is a collimating lens. The lens 130 is a lens for collecting the light reflected by the subject 200 and guiding the collected light to the light-receiving device 120 and is a condenser lens.

The signal processing unit 140 is a circuit for generating a signal corresponding the difference between a signal input from the light-receiving device 120 and a reference signal input from the control unit 150. The control unit 150 includes, for example, a Time to Digital Converter (TDC). The reference signal may be a signal input from the control unit 150 or may be an output signal of a detection unit that directly detects the output of the surface emitting laser device 1. The control unit 150 is, for example, a processor that controls the surface emitting laser device 1, the light-receiving device 120, the signal processing unit 140, the display unit 160, and the storage unit 170.

The control unit 150 is a circuit for measuring the distance to the subject 200 on the basis of the signal generated by the signal processing unit 140. The control unit 150 generates a video signal for displaying information regarding the distance to the subject 200 and outputs the generated video signal to the display unit 160. The display unit 160 displays the information regarding the distance to the subject 200 on the basis of the video signal input from the control unit 150. The control unit 150 stores, in the storage unit 170, the information regarding the distance to the subject 200.

Application Example

The present technology is applicable to various products. For example, the technology according to the present disclosure may be realized as an apparatus mounted on any type of moving object such as an automobile, an electric vehicle, a hybrid electric vehicle, a motorcycle, a bicycle, personal mobility, an airplane, a drone, a ship, and a robot.

Figure 20:
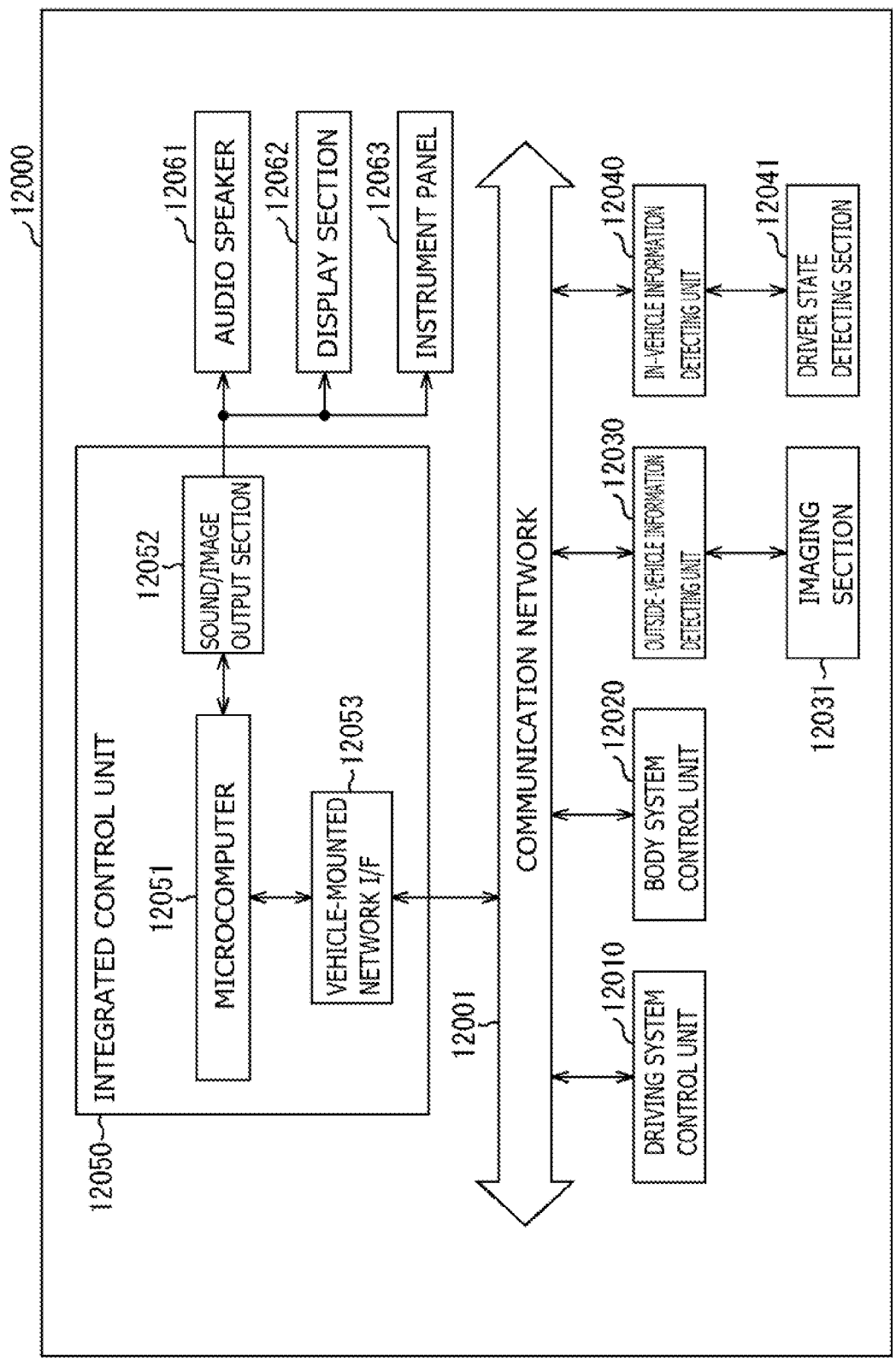
FIG. 20 is a block diagram of a vehicle control system according to the application example of the present technology.

FIG. 20 is a block diagram depicting an example of schematic configuration of a vehicle control system as an example of a mobile body control system to which the technology according to an embodiment of the present disclosure can be applied.

A vehicle control system 12000 includes a plurality of electronic control units connected to each other via a communication network 12001. In the example depicted in FIG. 20, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with a distance measuring device 12031. The distance measuring device 12031 includes the above-mentioned distance measuring device 100. The outside-vehicle information detecting unit 12030 makes the distance measuring device 12031 measure the distance to an object (subject 200) of the outside of the vehicle, and acquires distance data thus obtained. On the basis of the acquired distance data, the outside-vehicle information detecting unit 12030 may perform processing of detecting an object such as a human, a vehicle, an obstacle, a sign, or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 20, an audio speaker 12061, a display section 12062, and an instrument panel 12063 are illustrated as the output device. The display section 12062 may, for example, include at least one of an on-board display and a head-up display.

Figure 21:
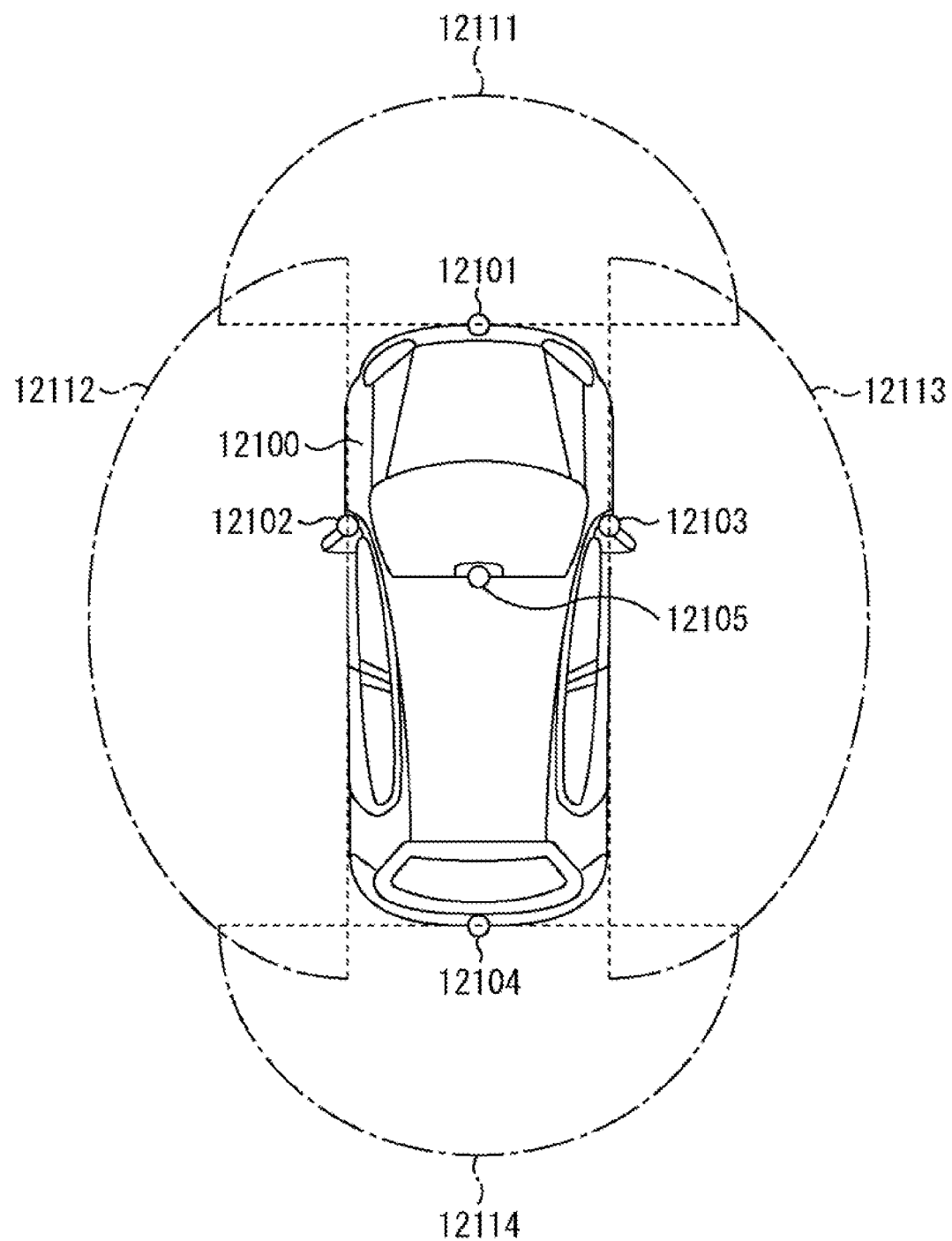
FIG. 21 is a schematic diagram showing an example of installation positions of the distance measuring device.

FIG. 21 is a diagram depicting an example of the installation position of the distance measuring device 12031.

In FIG. 21, the distance measuring device 12031 includes distance measuring devices 12101, 12102, 12103, 12104, and 12105.

The distance measuring devices 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The distance measuring device 12101 provided to the front nose and the distance measuring device 12105 provided to the upper portion of the windshield within the interior of the vehicle obtain mainly data of the front of the vehicle 12100. The distance measuring devices 12102 and 12103 provided to the sideview mirrors obtain mainly data of the sides of the vehicle 12100. The distance measuring device 12104 provided to the rear bumper or the back door obtains mainly data of the rear of the vehicle 12100. The data of the front obtained by the distance measuring devices 12101 and 12105 is used mainly to detect a preceding vehicle, a pedestrian, an obstacle, a signal, a traffic sign, or the like.

Incidentally, FIG. 21 depicts an example of detecting ranges of the distance measuring devices 12101 to 12104. A detecting range 12111 represents the detecting range of the distance measuring device 12101 provided to the front nose. Detecting ranges 12112 and 12113 respectively represent the detecting ranges of the distance measuring devices 12102 and 12103 provided to the sideview mirrors. A detecting range 12114 represents the detecting range of the distance measuring device 12104 provided to the rear bumper or the back door.

For example, the microcomputer 12051 can determine a distance to each three-dimensional object within the detecting ranges 12111 to 12114 and a temporal change in the distance (relative speed with respect to the vehicle 12100) on the basis of the distance data obtained from the distance measuring devices 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance data obtained from the distance measuring devices 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

An example of a mobile body control system to which the technology according to the present disclosure can be applied has been described above. The technology according to the present disclosure is applicable to the distance measuring device 12031 of the configurations described above.

Although the present disclosure has been described by way of embodiments, the present disclosure is not limited to the embodiments described above and various modifications can be made. Note that the effects described in the specification are merely examples. The effects of the present disclosure are not limited to the effects described in the specification. The present disclosure may have additional effects other than the effects described in the specification.

It should be noted that the present technology may also take the following configurations.

(1) A light-emitting element array, including:
a plurality of light-emitting elements two-dimensionally arranged on a light-emitting element surface of the light-emitting element array, each of the plurality of light-emitting elements being a vertical cavity surface emitting laser and being formed in a mesa shape surrounded by a recessed portion formed in the light-emitting element surface, an inclined surface being formed on an outer periphery of a light-emitting element group including the plurality of light-emitting elements, a depth of the recessed portion from the light-emitting element surface gradually increasing as away from the light-emitting element group.

(2) The light-emitting element array according to (1) above, further including:
a substrate; a first contact layer provided on the substrate; a first DBR (distributed Bragg reflector) layer provided on the first contact layer; an active layer; a second DBR layer that sandwiches the active layer with the first DBR layer; and a second contact layer provided on the second DBR layer, in which
the active layer, the second DBR layer, and the second contact layer are each separated by the recessed portion between the plurality of light-emitting elements, and the first contact layer and the substrate are each continuous between the plurality of light-emitting elements.

(3) The light-emitting element array according to (2) above, in which
the first DBR layer is separated by the recessed portion between the plurality of light-emitting elements.

(4) The light-emitting element array according to (2) or (3) above, in which
the inclined surface is formed in one or both of the substrate and the first contact layer.

(5) The light-emitting element array according to any one of (1) to (4) above, in which
the inclined surface has a shape whose depth from the light-emitting element surface changes by 1 µm or more.

(6) A method of producing a light-emitting element array, including:
forming a recessed portion by reactive ion etching at 80° C. or less in a stacked body formed of a semiconductor material to form each a plurality of light-emitting elements in a mesa shape surrounded by the recessed portion formed in a light-emitting element surface, each of the plurality of light-emitting elements being a vertical cavity surface emitting laser, the plurality of light-emitting elements being two-dimensionally arranged on the light-emitting element surface and form an inclined surface on an outer periphery of a light-emitting element group including the plurality of light-emitting elements, a depth of the recessed portion from the light-emitting element surface gradually increasing as away from the light-emitting element group.

REFERENCE SIGNS LIST surface emitting laser device
10 laser chip
11 light-emitting element array
12 light-emitting element
13 substrate
14 bump
121 first contact layer
122 first DBR layer
123 current confinement layer
124 first spacer layer
125 active layer
126 second spacer layer
127 second DBR layer
128 second contact layer
131 recessed portion
132 mesa
133 inclined surface

The invention claimed is:

1. A light-emitting element array, comprising:
a substrate;
a first contact layer on the substrate;
a light-emitting element group that includes a plurality of light-emitting elements in a two-dimensional arrangement on a light-emitting element surface of the light-emitting element array, wherein
each light-emitting element of the plurality of light-emitting elements is a vertical cavity surface emitting laser, and
each light-emitting element of the plurality of light-emitting elements has a mesa shape surrounded by a recessed portion in the light-emitting element surface;
an outer peripheral region that surrounds the light-emitting element group; and
an inclined surface in the first contact layer, and on an outer periphery of the light-emitting element group, wherein
a depth of the recessed portion from the light-emitting element surface increases from the light-emitting element group to the outer peripheral region, and
the outer periphery is a boundary between the light-emitting element group and the outer peripheral region.

2. The light-emitting element array according to claim 1, further comprising:
a first distributed Bragg reflector (DBR) layer-provided on the first contact layer;
an active layer;
a second DBR layer, wherein the active layer is between the first DBR layer and the second DBR layer; and
a second contact layer on the second DBR layer, wherein
the active layer, the second DBR layer, and the second contact layer are each separated by the recessed portion between the plurality of light-emitting elements, and
the first contact layer and the substrate are each continuous between the plurality of light-emitting elements.

3. The light-emitting element array according to claim 2, wherein the first DBR layer is separated by the recessed portion between the plurality of light-emitting elements.

4. The light-emitting element array according to claim 2, wherein the inclined surface is in both the substrate and the first contact layer.

5. The light-emitting element array according to claim 1, wherein the inclined surface has a shape whose depth from the light-emitting element surface changes by at least 1 µm.

6. A method of producing a light-emitting element array, the method comprising:
forming a contact layer on a substrate;
forming a recessed portion in a light-emitting element surface of the light-emitting element array by reactive ion etching at 80° C. or less in a stacked body formed of a semiconductor material, wherein
the forming of the recessed portion is to form a plurality of light-emitting elements in a mesa shape surrounded by the recessed portion,
each of the plurality of light-emitting elements is a vertical cavity surface emitting laser,
the plurality of light-emitting elements is two-dimensionally arranged on the light-emitting element surface, and
an outer peripheral region surrounds a light-emitting element group that includes the plurality of light-emitting elements; and
forming an inclined surface in the contact layer, and on an outer periphery of the light-emitting element group including the plurality of light-emitting elements, wherein
a depth of the recessed portion from the light-emitting element surface increases from the light-emitting element group to the outer peripheral region, and
the outer periphery is a boundary between the light-emitting element group and the outer peripheral region.

* * * * *